May 13, 1930.  B. C. STICKNEY  1,758,015
TYPEWRITING MACHINE
Filed May 12, 1927   2 Sheets-Sheet 1

Inventor:
Burnham C. Stickney

May 13, 1930.  B. C. STICKNEY  1,758,015
TYPEWRITING MACHINE
Filed May 12, 1927   2 Sheets-Sheet 2
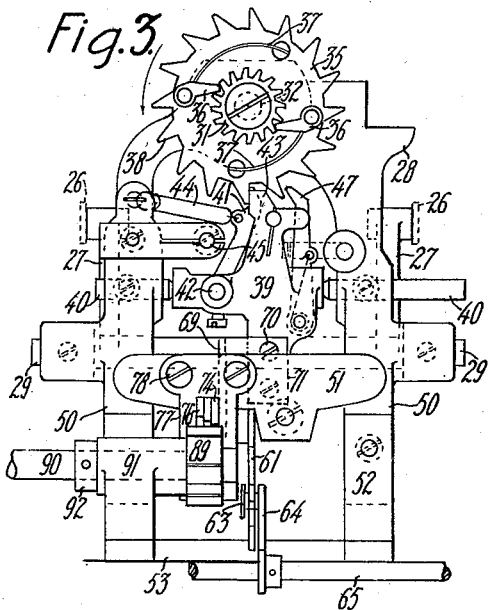
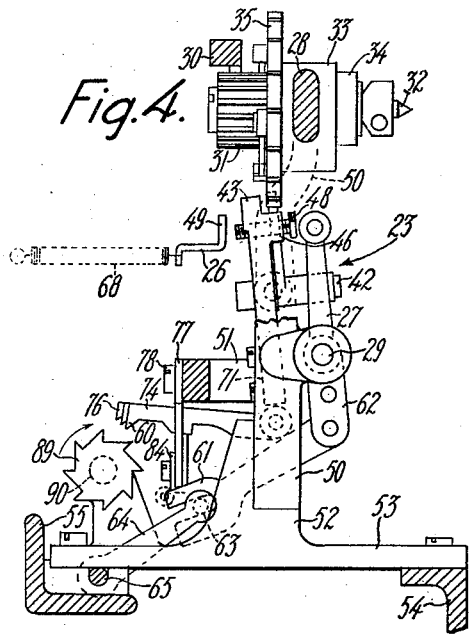
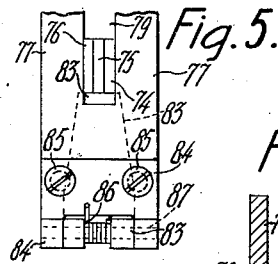
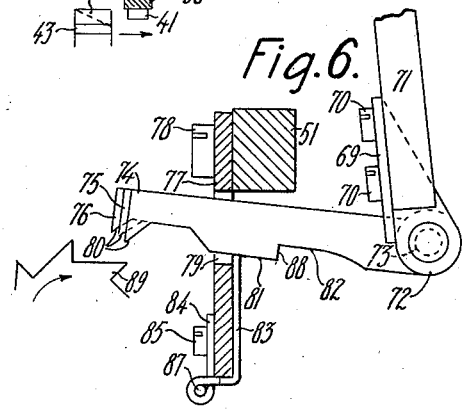
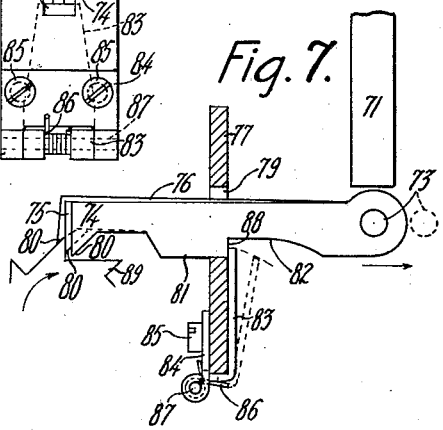
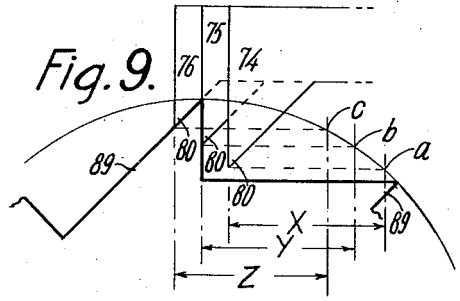
Inventor.
Burnham C. Stickney Patented May 13, 1930

1,758,015

UNITED STATES PATENT OFFICE

BURNHAM C. STICKNEY, OF HILLSIDE, NEW JERSEY, ASSIGNOR TO UNDERWOOD ELLIOTT FISHER COMPANY, OF NEW YORK, N. Y., A CORPORATION OF DELAWARE

TYPEWRITING MACHINE

Application filed May 12, 1927. Serial No. 190,692.

This invention relates to typewriting machines and more specifically to a motor-driven repulser operative to repulse or project the type-bar away from the typing position immediately after each type-impact and incidentally speed up the carriage-feeding mechanism for letter-spacing.

The Underwood carriage-feeding mechanism includes a type-bar-actuated universal bar forming a part of a reciprocable frame that operates as an intermediary member between the type-bars and the escapement-dog rocker to operate the latter by abutment therewith rather than by a positive connection. This reciprocating frame is vibrated rearwardly by each type-bar against the tension of a spring to vibrate a mechanism operable to effect a step-by-step feed to a ribbon-spool, upon the spring-actuated return reciprocation of the frame. The dog-rocker is provided with a stepping dog normally in engagement with a tooth of the escapement-wheel and a beveled dog that operates as a holding dog during the stepping interval of the stepping dog, as at the end of the down stroke of the keys. The tooth of the escapement-wheel passes from the control of the stepping dog to the control of the beveled face of the holding dog and the effect of the carriage-spring tension acting through the tooth of the escapement-wheel against the beveled face of the holding dog is to reverse the direction of the reciprocation for the rocker at the end of the key-stroke, drive the universal bar to repulse the type-bar, and accelerate the return movement of the rocker to release the escapement-tooth and permit the next advancing tooth of the wheel to engage the stepping dog for a letter-space movement.

A type-bar is usually slightly sluggish at the instant of the type-impact, due to mechanical sacrifices made for accelerations of motion in front-strike machines, but the Underwood universal bar, as an intermediary member is subject to the camming reactions of the beveled dog on the rocker and the universal bar becomes a limited repulser for forcing the type-bar away from the printing position, and it is this combination of type-bar-actuated universal bar and beveled holding dog that gives the Underwood machine the pre-eminence it enjoys for speed of manipulation in typing.

It is the purpose of the present invention to so improve upon this highly developed carriage-feeding mechanism of the Underwood typewriting machine by retaining the speed-producing features and further providing a motor-driven auxiliary accelerator for the escapement-rocker which becomes automatically operative at the end of the down stroke of the keys to speed up the "let-off" of the holding dog to more quickly release the carriage and simultaneously repulse or speed up the return of the type-bar after a type-impression; to provide a motor-driven accelerator rendered operative by the reciprocation of the universal bar in one direction to accelerate the return reciprocation of the universal bar and its associated-feeding dogs; to provide that the feeding of the ribbon shall be accomplished by this motor-driving element and thus relieve the universal bar of the excessive spring tension now employed, and which tension must be offset by the impact of the type-bars against the universal bar; and to further provide a motor-driven escapement-rocker accelerator and type-bar repulser that is responsive to a lighter touch upon the keys and applicable to existing mechanisms without change.

The bevel face of the holding dog in vibrating into contact with the advancing edge of the escapement-tooth under the manipulation of moderately fast operators becomes a stop which arrests the movement of the rocker and produces a shock that is annoying to operators who permit the fingers to linger upon the keys. This is a bevel-dog characteristic. In the present improved structure, the bevel face of the holding dog is eliminated and a flat, smooth, tooth-holding face substituted, which permits the holding dog to slide under the escapement-tooth without stop-engaging faces and without shock to the operator's fingers. The motor-driven accelerator being instantaneously effective regardless of any overthrow of the holding dog derived from an erratic manipulation of the keys, the annoying stop which usually arrests the dog-rocker at the end of its stroke is not required.

Where a motor-driven toothed rotator is employed to intermittently actuate a key-released member which becomes an intermediary-driving element to other mechanisms, as employed in various ways in typewriting and similar machines, the possibility of the released member striking the point of a rotating tooth and then being picked up by the next advancing tooth represents a lost interval of time, and the transmission from the rotator to said member is not uniformly instantaneous. Where the intermediary member operates a type-bar or a key-lever in typing, this inactive interval is so slight that it may be disregarded. In the present instance, however, where the intermediary member is employed to speed up a fast-operating escapement-rocker, it is an advantage to remove all false or lost motions so that the transmission from the rotator to the escapement-rocker shall be instantaneous and operate faster than any spring tension can operate to restore the rocker. To this end, the present invention includes a plurality of intermediary members between the motor-driven rotator and the escapement-rocker which takes the form of single-tooth pawls arranged side by side in a series and fulcrumed upon the same pivot carried by an extension of the rocker. The toothed ends of the pawls normally overhang the rotator and are arranged to drop by gravity or under the tension of a very light spring, if required, into engagement with said rotator. This series of intermediary pawls vary in length so that the toothed ends thereof assume a series of progressive steps, and, when dropped into the rotator, the tooth of one pawl will immediately engage the advancing tooth of the rotator, and, while all the pawls will be moved by the rotator by reason of their pivotal connecting unit, only one of the pawls will really be active in conveying motion from the rotator to the rocker. By thus arranging the stepped ends of the pawls to progressively cover the space between two adjoining teeth on the rotator, it is obvious that one pawl must always be instantly picked up by the rotator.

It is also obvious that were the whole series of pawls to have a uniform drop into the rotator, a variable throw of the rocker would result before the pawl was thrown out of the radius of the rotator, and a variable throw to the escapement-rocker would result. The present pawls are arranged to drop to a uniform plane, but the teeth of each pawl progressively vary in depth of engagement with the rotator, so that the operative throw of the pawls as a series will be uniform, regardless of their length and point of entrance into the rotary field of the rotator's teeth.

Other features and advantages will hereinafter appear.

In the accompanying drawings,

Figure 3 is a full-sized front elevation of the escapement-devices mounted upon an escapement-bracket shown detached from the machine-frame.

Figure 4 is a side elevation of Figure 3, showing the escapement-bracket mounted upon sections of the machine-frame.

Figure 5 is an enlarged front view showing details of mounting the reciprocating escapement-rocker accelerator-pawls.

Figure 6 is an enlarged view showing the accelerator-pawls in normal position relative to the power-driven toothed rotator.

Figure 7 is a view similar to Figure 6 of the accelerator-pawls positioned forwardly upon the escapement-rocker when dropped into operative engagement with the rotator to be restored thereby.

Figure 8 is an enlarged diagram of the normal relation of the teeth of the escapement-wheel to the stepping and holding dogs of the rocker.

Figure 9 is an enlarged diagram of the rotator and the accelerator-pawls, illustrating the relative lengths and depths of each pawl-tooth to provide for a uniform throw of the dog-rocker irrespective of which pawl operatively engages the rotator.

Figures 1, 2:
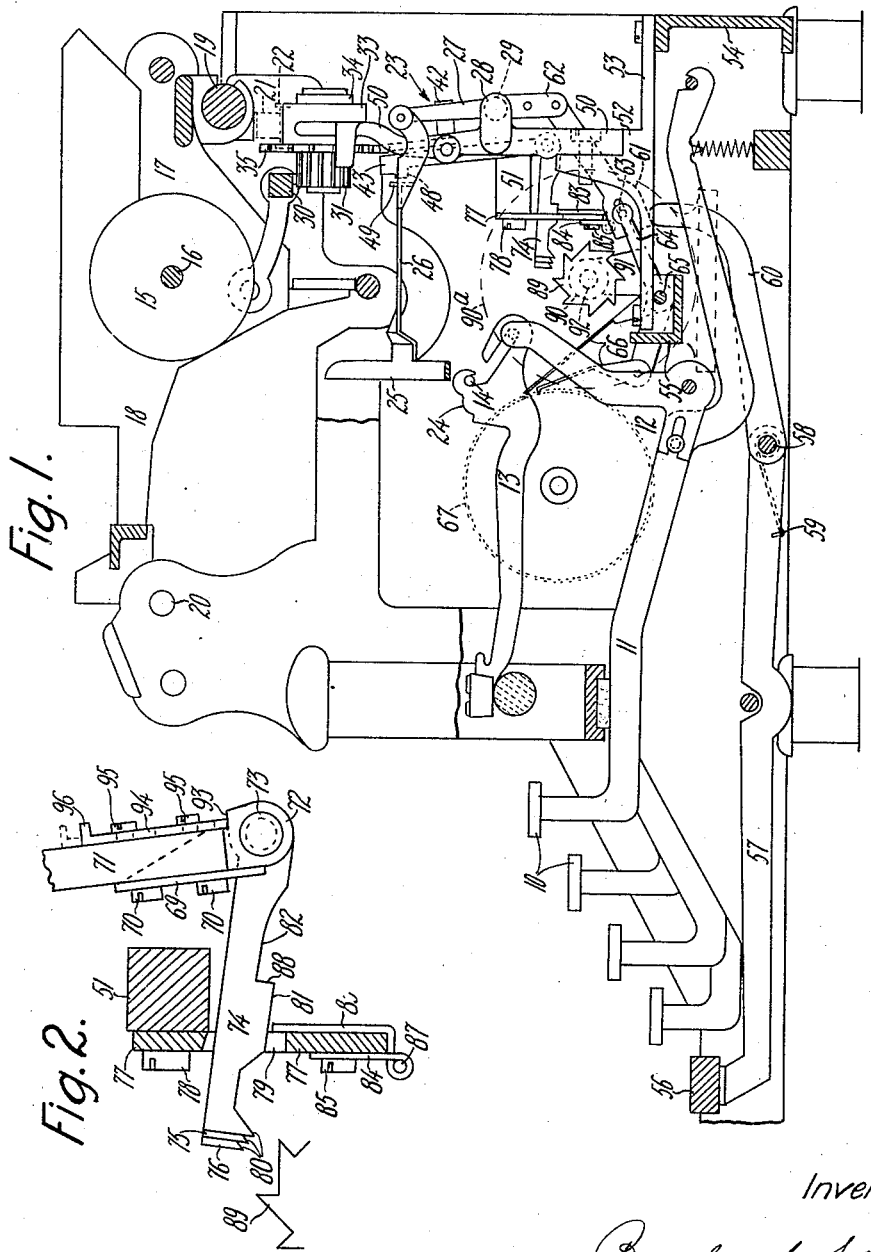
Figure 1 is a right-hand side elevation of an Underwood typewriting machine, partly in section, with many of the parts removed for clearness, and only such parts shown that are essential to understand the present invention.
Figure 2 is an enlarged view of the pawls secured to the lower section of the escapement-rocker, and locked in a raised or inoperative position relative to the power-driven rotator by a manually-set slide at the rear of the rocker-section.

In the Underwood typewriter, keys 10 depress key-levers 11 to operate bell-cranks 12 to swing type-bars 13 about a pivot-wire 14 upwardly and rearwardly against the front face of a platen 15 mounted upon a shaft 16 carried by each end of a platen-frame 17 mounted within a carriage 18 movable upon carriage-rails 19 and 20 under the pulling influence of a tape 21 connecting the carriage to a carriage-motor 22 and operative under the letter-spacing control of an escapement-mechanism 23. Each type-bar 13 is formed with a heel 24 operative to strike a curved universal bar 25 that includes a frame 26 pivotally supported at its rear ends by a pair of arms 27 mounted upon an escapement-bracket 28, as upon pivots 29. A carriage-feed rack 30 meshes with a pinion 31 loosely mounted upon a shaft 32 rotatable within a housing 33 upon ball-bearing elements 34. To provide that the pinion 31 may rotate independently of the shaft 32 in one direction, and rotate with the shaft in the reverse direction, an escapement-wheel 35 fast upon the shaft 32 supports a pair of pawls 36 having springs 37 to press the pawls into engagement with the teeth of the pinion 31. To co-operate with the teeth 38 of the escapement-wheel 35 a rocker 39 has a vibratory movement upon pivots 40, and includes a stepping dog 41, pivoted at 42 on the rocker, and a holding dog 43 forming a part of the rocker. The stepping dog 41 has a spring 44 connected to the bracket 28 to swing the dog against a stop 45, when released by a tooth 38, and a normal stop-face 46, when the dog is holding a tooth 38 against the tension of the carriage-motor. The rocker may also have the usual pivoted check-pawl 47 to prevent excessive backward rotation of the wheel 35 when the carriage is shifted for a new line. The escapement-rocker 39 is further provided with an adjustable screw 48 arranged to be engaged by an ear 49 formed in the frame 26.

The bracket 28 has the form of an inverted U with arms 50 joined together by a cross-bar 51 and the free ends secured to lugs 52 forming parts of a base-frame 53 secured to the back wall 54 of the machine-base and to a cross-bar 55 which provides that the escapement-devices may be readily removed as an assembled unit from the machine-frame.

A space-bar 56 is supported at each end by levers 57 secured to opposite ends of a rock-shaft 58 fulcrumed in the side walls of the machine-frame and provided with a restoring spring 59. The shaft 58 has an arm 60 midway of its length that extends rearwardly with an upturned end to engage an arm 61 secured to a lower extension 62 of the arms 27. The arm 61 has a bifurcated end to receive a stud 63 mounted at the end of a crank-arm 64 fixed to a rock-shaft 65 extending transversely across the machine and having at each end thereof a pair of pawls 66 operative to feed a ratchet 67 to rotate a ribbon-spool, not shown, and feed the ribbon through the typing position step by step at each actuation of the universal bar 25.

When a key is depressed the type-bar is raised to the platen, and, just prior to the impact of the type, the heel 24 thereof vibrates the universal bar 25 and the frame 26 rearwardly when the ear 49 engages the screw 48 to vibrate the rocker 39 in unison therewith to become operative to shift the stepping dog 41 out of holding engagement with the escapement-wheel tooth and bring the holding dog 43 into holding engagement therewith during the impact of the type-face in typing. The initial return movement of the type-bar releases the universal bar 25 and the frame 26 to the tension of a spring 68, and the rocker 39 to the tension of the spring 44 of the stepping dog, and the stepping dog becomes operative to intercept the next advancing tooth of the escapement-wheel and a letter-space movement takes place. The vibration of the frame 26 causes the arms 27 to vibrate the extension 62, the arms 61 and the crank-arm 64 to rock the shaft 65, and draw the pawls 66 idly over the ratchet-teeth of the ratchet 67, and operate to feed the ratchet when the frame 26 is restored by the spring 68.

When the space-key is depressed the vibration of the arm 61 vibrates the two arms 27 to draw the frame 26 into engagement with the rocker 39 to rock the latter and effect the carriage feeding movement of the escapement-dogs.

To assist the spring 44 in restoring the rocker 39, the dog 43 is formed with an angular face 43$^a$, shown at Figure 8, and the impact of the advancing tooth 38$^a$ against the face 43$^a$ under the carriage tension operates to force the rocker towards its normal tooth-holding position and propels the universal bar as a repulser against the type-bar.

The construction up to this point is similar to that of the standard Underwood machine, and further detail construction may be had in the patent to Helmond, No. 1,411,024, dated March 28, 1922.

The present invention includes a bracket 69 secured by screws 70 to the face of a lower extension 71 of the rocker 39, one edge of the bracket being turned at right angles to form an ear 72 having a pivot-stud 73 to support a series of single-toothed pawls side by side thereon. These pawls, in the present case, are three in number, 74, 75 and 76, and extend forwardly from the rocker 39. To support and guide the free ends of these pawls, a plate 77 may be secured to the face of the cross-bar 51 by screws 78, and formed with a slot 79 within which the pawls have a free up-and-down or a forward-and-rearward sliding movement. Each pawl 74, 75 and 76 is formed with a single tooth 80 at its free end, a sliding-edge face 81, and a clearance-space 82. The normal position of these pawls is shown at Figure 6, where the free ends are inclined upward from resting upon the top edge of a finger 83 that has a hinged connection to a plate 84 secured to the front face of the plate 77 by screws 85. The finger 83 is formed to pass under the lower edge of the plate 77, and then upwardly to lie flat against the rear face of said plate and project above the lower edge of the slot 79, as shown, and normally held in this position by a spring 86 coiled about a hinge pin 87.

When the rocker 39 is vibrated by the universal bar in typing, the extension 71 thereof will assume the position of Figure 7 where the three pawls 74, 75 and 76 have moved forwardly until the faces 81 drop off the upper end of the finger 83 to rest upon the lower edge of the slot 79 when said finger 83 enters the clearance-spaces 82 of all three pawls.

When the rocker is restored or moved in the direction of the arrow in Figure 7, the pawls, through the abutment of the edges 88 of the spaces 82 with the exposed end of the finger 83, will vibrate said finger to the dotted position where the edges 88 will clear the finger and the finger will then respond to the spring 86 and raise the pawls to the positions of Figure 6. The purpose of this construction is to provide an abrupt drop of the toothed ends 80 of the pawls at the end of the rocker movement under the impulse of the type-bar-actuated universal bar for purposes to appear.

89 indicates a continuously-revolving toothed rotator or driver having comparatively coarse teeth to provide for a considerable depth of tooth. The rotator is secured to the end of a drive shaft 90 having a bearing 91 forming a part of the base 53 and provided with a collar 92 to prevent endwise motion of the shaft. The shaft 90 may have a second bearing at the side frame of the machine and may be connected to any convenient source of constant power, as to a motor 90$^a$.

The rotator 89 is rotated in a direction towards the pawls 74, 75, 76, and were these pawls moved towards the rotator in a straight line by the escapement-rocker, it is apparent that the rotator would prevent the vibration of the escapement-mechanism through the collision of the teeth. For this reason, the pawls 74, 75, 76 are first guided by the finger 83 to a point where the toothed ends thereof are directly over the rotator, when the pawls are abruptly dropped into the teeth of the rotator by the face 81 of each pawl riding off the top of the finger 83. In this manner the pawls are assured a uniform throw from contact with the rotating teeth of said rotator whether the pawls are quickly advanced by the rocker under a staccato blow at the keys, or slowly advanced by a slow depression of the keys. The speed of manipulation of the keys has no effect to vary the point where the pawls are engaged or picked up by the rotator.

It is apparent that, with the use of a single pawl 74 as an intermediary member between the rocker 39 and the rotator 89, it would frequently happen that the toothed end of the pawl would just miss the advancing tooth of the rotator, and an interval of time would be lost in waiting for the next advancing tooth of the rotator, and for this reason most rotators of this character are cut with fine teeth to reduce this inactive interval before the engagement of the pawl and a rotating tooth of the rotator.

In the present invention this inactive interval is wholly removed in a simple and practical manner by providing the escapement-rocker 39 with the plurality of intermediary pawls 74, 75 and 76, each pawl varying in length and operative as a stepped-off series to instantly interlock with the rotator at varying positions of an advancing tooth thereof.

Were a single pawl 74 provided with a plurality of teeth, some tooth of the pawl would instantly drop into interlock with a tooth of the rotator and without loss of time, but it is obvious that such arrangement would transmit a variable throw to the pawl predetermined by the point where the rotator picked up a tooth of the pawl in advance of the uniform point where the pawl disengaged itself from the rotator by its throw.

By the employment of a plurality of pawls in stepped relation as a series and each pawl operative to be individually driven by the rotator to throw the rocker, it remains to provide a means, as illustrated at Figure 9, that each pawl will automatically limit its throw by passing from the control of the rotator at verying points predetermined by the point of entrance to the rotator. It will be remembered that each pawl has an edge 81 that rests upon the finger 83; hence all the pawls assume a uniform plane as shown, but the depth of the tooth 80 of each pawl varies to determine the depth of entrance of the tooth into the rotary path of the rotator. When the series of pawls drop into the field of the rotator, the tooth 80 of the pawl 74 will have a deep entrance depth that provides for a driven movement of the pawl equal to the distance X, before the tooth 80 has passed from the control of the rotator at the point $a$; the tooth 80 of the pawl 75 will be picked up by the rotator in advance of the tooth of the pawl 74, and will have a shorter entrance depth for engagement with the rotator, and will pass out of the control of the rotator at the point $b$, the tooth having moved a distance of Y, which is equal to X; and the tooth 80 of the pawl 76 will be picked up by the rotator in advance of the other two pawls 75 and 74, and hence have a still shorter entrance depth into the path of the rotator, and will be released by the rotator at the point $c$, and have an operative movement equal to Z, with the same dimension as X and Y. In this manner, a plurality of pawls may be arranged in a series that progressively advance the point of entrance for all pawls into the sweep of a rotator-tooth to engage the tooth at varying positions, and hence provide interlocking means intermediate the escapement-rocker and the power-driven rotator that become operative without loss of time.

When a key-actuated type-bar is thrown to type, the universal bar vibrates the escapement-rocker to move the holding dog 43 under the operative tooth of the escapement-wheel. The rocking of the rocker 39 causes the whole series of pawls 74, 75 and 76 to slide forwardly over the edge of the finger 83 from the position of Figure 6 to that of Figure 7, where all the pawls have dropped from the finger to rest upon the lower edge of the slot 79, and the toothed end of the pawls has entered the field of a rotating tooth of the rotator 89. The pawl 75 has caught the advancing tooth of the rotator, the pawl 74 is forward of the rotator's tooth, and the pawl 75 rests upon the back face of the tooth. The pawl 75 has caught the tooth of the rotator after said tooth has passed the pawl 76 and before said tooth could engage the pawl 74; hence the two pawls 74 and 76 are inactive, and the pawl 75 becomes operative as an intermediary member to vibrate the rocker 39 to its normal position after a type-impact. In forcing the pawl 75 rearwardly the edge 88 will swing the finger 83 about the hinge pin 87 and when the tooth of the rotator swings clear of the pawl 75 the spring 86 will assert itself by restoring the finger 83 and raising the three pawls to the position of Figure 6.

In the present invention, the beveled dog-face 43ª is not employed, and the dog 43 is provided with a flat face to receive the flat face of the escapement-tooth at the typing point; hence there is nothing to arrest the typing movement of the dog and no shock is transmitted to the finger of the operator at the key. At the instant of type-impact, however, the pawls 74, 75, 76 have dropped into the field of the rotator, and, more quickly than the spring 44 could possibly react to restore the rocker and effect a carriage-feeding movement of the escapement-dogs, the engaging pawl has driven the rocker to its normal position by the sudden impact from a rotating tooth.

As the engagement of a rotating tooth with a pawl takes place approximately at the impact of the type, the universal bar-ear 49 is in contact with the screw 48 of the escapement-rocker, and the snappy restoration of the carriage-rocker by power-driven means conveys a sudden impulse to the frame 26, and the universal bar 25 becomes operative as a repulser to project the type-bar away from the platen-face.

As already described, the spring 68, in restoring the frame 26 after each type-impact, provides the motive power that vibrates the arm 64 to rock the shaft 65 and vibrate the pawls 66 to feed the ribbon, a reactionary force that the impact of the type-bar against the universal bar must overcome on the down stroke of the keys. It is obvious that, when the return of the escapement-rocker is effected by an auxiliary power-driven means, the burden of feeding the ribbon is assumed by said power-driven means, and the tension of the spring 68 may be greatly decreased, if not wholly removed, and the typing stroke at the keys correspondingly softened in touch.

It may be desirable at times to operate the typewriter independently of the power-driven attachment, and, while the pawls 74, 75 and 76 will be vibrated by the rocker 39 at each typing movement, means are provided to prevent the pawls from dropping into the rotator. At Figure 2, each pawl 74, 75 and 76 may be formed with a flat face 93 to be engaged by a slide 94 mounted upon the rear face of the rocker-extension 71, as with screws 95 passing through slots in the slide and threaded into the extension. The slide may be formed with a finger-piece 96 which, when lowered from the dotted position to the full-line position, forces the lower edge of the slide 94 into engagement with the faces 93 to slightly raise the pawls above the edge of the finger 83 and prevent the pawls from dropping into the rotator when said pawls are vibrated by the rocker in letter-spacing.

Variations may be resorted to within the scope of the invention, and portions of the improvements may be used without others.

Having thus described my invention, I claim:

1. In a typewriting machine having typing elements including type-bars, a carriage, carriage-feeding elements and a universal bar frame intermediate the typing elements and the carriage-feeding elements and operable by the typing elements in a typing direction, a motor-driven continuously-rotating driver, and means normally released from the rotary driver, but caused by the typing movement of the universal bar to operatively engage the rotary driver and forcibly restore the universal bar and the type-bar.

2. In an escapement mechanism for a typewriting machine, the combination with a dog-rocker arranged to be vibrated in one direction during the down stroke of a key, of a motor-driven rotating driver, and automatic means to connect said driver with said rocker by the movement of the rocker, to forcibly vibrate the rocker in a reverse direction.

3. In an escapement mechanism for a typewriting machine, the combination with a dog-rocker connected to be vibrated in one direction by the down stroke of the keys in typing, of a continuously revolving motor-driven driver, and means automatically presented to the revolving driver by the movement of said rocker during the operation of typing to enable said driver to forcibly effect only a return of said rocker.

4. In an escapement mechanism for a typewriting machine, the combination of a set of keys, an escapement-dog-rocker operatively connected to be key driven in one direction during the operation of typing, a constantly revolving motor-driven actuator and means common to the keys and carried by said rocker and connected with the actuator by the key-driven movement of said rocker, to drive the rocker only in a return direction.

5. In an escapement mechanism for a typewriting machine, the combination with a dog-rocker connected to be driven in one direction by the down stroke of the keys in typing, of a power-driven toothed actuator, and a dog-rocker-driving intermediary member having means when presented to the actuator by the key-driven rocker to operatively engage an advancing tooth of said actuator without loss of motion in effecting said engagement.

6. In a typewriting machine having a set of type-operating keys, a carriage-feeding mechanism including a dog-rocker and a key-actuated universal bar operative to vibrate said dog-rocker, a carriage-feeding accelerating mechanism including a motor-driven continuously rotating driver, and an intermediary member common to the keys and connected to said rocker and shifted thereby into interlock with said driver by the movement of the universal bar, and effective to speed up the return movement of said universal bar, to repulse the type-bars after typing.

7. In a typewriting machine having a carriage-feeding mechanism including a dog-rocker and a type-bar-actuated universal bar operative to vibrate said dog-rocker, a carriage-feeding accelerating mechanism including a motor-driven continuously rotating driver, and an intermediary member normally released from said driver and movable with said rocker and automatically connectible with said driver by its throw when vibrated by the rocker in typing.

8. In a typewriting machine having a carriage-feeding mechanism including a dog-rocker and a type-bar-actuated universal bar operative to vibrate said dog-rocker, a carriage-feeding accelerating mechanism including a motor-driven rotating driver, and an intermediary member movable with said rocker and automatically connectible with said driver by its throw in one direction and disengageable from said driver by its throw when the direction of its movement is reversed by the driver.

9. In a typewriting machine having a carriage-feeding mechanism including a dog-rocker and a type-bar-actuated universal bar operative to vibrate said dog-rocker, a carriage-feeding accelerating mechanism including a motor-driven rotating driver, and a plurality of intermediary members movable with said rocker and each member operable to individually connect with said driver to drive the rocker in a reverse direction.

10. In a typewriting machine having a carriage-feeding mechanism including a dog-rocker and a type-bar-actuated universal operative to vibrate said dog-rocker, a carriage-feeding accelerating mechanism including a motor-driven rotating driver, and a plurality of intermediary members of varying lengths movable with the rocker and each member being operable to connect with said driver at different points of its rotation and drive the rocker uniform distances in a reverse direction.

11. In a typewriting machine having a carriage-feeding mechanism including a dog-rocker and a type-bar-actuated universal bar operative to vibrate said rocker in typing, a motor-driven rotating driver, and a pawl having a driving connection with said rocker and shiftable with said rocker in typing, to present itself to be driven by said driver in a reverse direction and forcibly restore the dog-rocker, universal bar and type-bar after each typing operation.

12. In a typewriting machine having a carriage-feeding mechanism including a dog-rocker, and a type-bar-actuated universal bar operative to vibrate said rocker in typing, a motor-driven continuously rotating driver, a pawl-mechanism normally disconnected from said driver but having a driving connection with the rocker and shiftable therewith in typing to present itself to said driver, and means for guiding said pawl to and from the rotating driver.

13. In a typewriting machine having a carriage-feeding mechanism including a dog-rocker, and a type-bar-actuated universal bar operative to vibrate said rocker in typing, a motor-driven rotating driver, a pawl having a driving connection with the dog-rocker, a guide operative to elevate the pawl over the driver during the typing movement of said rocker, and means carried by the pawl and co-operative with the elevating guide to ensure a positive engagement between the pawl and the driver at the end of the rocker-driven throw of the pawl.

14. In a typewriting machine having a type-bar-actuated universal bar and a ribbon-driving mechanism operatively connected to be fed step by step by the return movement of said universal bar, a motor-driven rotating driver, and means movable with and settable by the universal bar in typing, to be engaged by the driver and forcibly restore the universal bar to feed the ribbon-driving mechanism after each typing movement.

BURNHAM C. STICKNEY.